(12) United States Patent
Yu et al.

(10) Patent No.: US 8,153,286 B2
(45) Date of Patent: Apr. 10, 2012

(54) PERFLUOROCARBON IONOMER MEMBRANE WITH HIGH PROTON CONDUCTIVITY AND PREPARATION THEREOF

(75) Inventors: Tzyy-Lung Leon Yu, Chung-Li (TW);
Hsiu-Li Lin, Chung-Li (TW);
Shih-Hung Chan, Chung-Li (TW);
Fang-Hsin Han, Chung-Li (TW);
Kun-Sheng Shen, Chung-Li (TW);
Guo-Bin Jung, Chung-Li (TW)

(73) Assignee: Yuan Ze university, Taoyuan (TW)

( * ) Notice: Subject to any disclaimer, the term of this patent is extended or adjusted under 35 U.S.C. 154(b) by 414 days.

(21) Appl. No.: 12/470,036

(22) Filed: May 21, 2009

(65) Prior Publication Data
US 2009/0280385 A1    Nov. 12, 2009

Related U.S. Application Data

(62) Division of application No. 11/255,914, filed on Oct. 24, 2005, now Pat. No. 7,560,497.

(51) Int. Cl.
*H01M 8/10* (2006.01)

(52) U.S. Cl. .............. 429/33; 429/30; 521/27; 427/162; 427/169; 428/333; 428/411.1

(58) Field of Classification Search .................... 429/33, 429/30; 521/27; 427/162, 169; 428/333, 428/411.1
See application file for complete search history.

(56) References Cited

U.S. PATENT DOCUMENTS

| | | | | |
|---|---|---|---|---|
| 6,080,501 A * | 6/2000 | Kelley et al. | ................. | 429/421 |
| 6,114,031 A * | 9/2000 | Roberts et al. | ................. | 428/333 |
| 7,611,628 B1* | 11/2009 | Hinds, III | ................. | 210/500.27 |
| 2006/0263660 A1* | 11/2006 | Takaoka et al. | ................. | 429/33 |

OTHER PUBLICATIONS

L. Rubatat et al., "Fibrillar Structure of Nafion: Matching Fourier and Real Space Studies of Corresponding Films and Solutions", Macromolecules 2004, 37, 7772-7783, American Chemical Society 2004.*
T. L. Morkved et al., "Local Control of Microdomain Orientation in Diblock Copolymer Thin Films with Electric Fields", Science, vol. 273. Aug. 16, 1996 pp. 931-932.*

* cited by examiner

*Primary Examiner* — Peter D. Mulcahy
*Assistant Examiner* — Henry Hu
(74) *Attorney, Agent, or Firm* — WPAT, P.C.; Anthony King

(57) ABSTRACT

The present invention provides a perfluorocarbon ionomer membrane with aligned fibril-like nanostructures and its preparation method.

8 Claims, 6 Drawing Sheets

PERFLUOROCARBON IONOMER MEMBRANE WITH HIGH PROTON CONDUCTIVITY AND PREPARATION THEREOF

CROSS-REFERENCE TO RELATED APPLICATIONS

This application claims priority to, and is a Divisional of, U.S. patent application Ser. No. 11/255,914, filed on Oct. 24, 2005, now pending, which is hereby incorporated by reference in its entirety.

Although incorporated by reference in its entirety, no arguments or disclaimers made in the parent application apply to this divisional application. Any disclaimer that may have occurred during the prosecution of the above-referenced application(s) is hereby expressly rescinded. Consequently, the Patent Office is asked to review the new set of claims in view of all of the prior art of record and any search that the Office deems appropriate

FIELD OF THE INVENTION

The present invention relates to a novel perfluorocarbon ionomer membrane and preparation thereof.

BACKGROUND OF THE INVENTION

Polyelectrolyte membranes, such as perfluorosulfonated ionomers (U.S. Pat. Nos. 4,433,082; 5,422,411; 6,100,324), sulfonated poly(ether ether ketone), sulfonated poly(ether ether ketone) (Bishop M T, Karasz F E, Russo P S, Langley K H, Macromolecules, 18, 86 (1985)), and poly(benze imidazole) (U.S. Pat. Nos. 5,091,087; 5,525,436; 6,042,968) are materials of considerable commercial significance because of their use as solid polymer electrolytes in fuel cells and other applications in electrochemistry, separation technology, and a variety of electrochemical process and devices including chlor-alkali cells. High ionic conductivity is one of the important requirements for the application of polyeletrcolyte membranes in fuel cells. Lots of researchers have reported methods of improving the conductivity by chemical modification (Rikukawa M and Sanui K, Prog. Polym. Sci., 25, 1463 (2000)) or inserting inorganic oxides into ionic aggregation regions of polyeletrcolyte membranes (U.S. Pat. Nos. 5,523, 181 and 5,766,787).

One of the most widely used polyelectrolytes in the application of proton exchange membrane fuel cells is perfluorosulfonated ionomer membrane. Phase separation between the hydrophobic component and the hydrophilic ionic groups happens in perfluorosulfonated ionomer membranes, which is heterogeneous on nanometer scale (Rubatt L, Gebel G, Diat O, Macromolecules, 37, 7772 (2004)). It is believed that the nano-structure of ionic aggregates is strongly correlated with proton transport properties of membranes. Thus to control the morphology and nano-structure of ionic aggregations is one of the methods to improve the ionic conductivity of polyelectrolyte membranes. In literature, it has been reported that the nano-structure of block copolymers can be aligned using an electric field (Amundson K, Helfand E, Davis D D, Quan X, and Patel S S, Macromolecules, 24, 6546 (1991)); (Morkved T L, Lu M, Urbas A M, Ehrichs E E, Jaeger H M, Mansky P, and Russel T P, Science, 271, 931 (1996)).

BRIEF DESCRIPTION OF THE DRAWINGS

FIG. 4(a) is a cartoon corresponding to a TEM micrograph of FIG. 3(c). The rods are bundles of fibrils, which have diameters of 1~2 nm and are elongated polymeric aggregates surrounded with ionic charges. The rods are aligned along the membrane thickness direction. The long thick linear arrow is a proton traveling path, which moves across the cross section of a membrane and parallel to the electric field in a linear line.

FIG. 4(c) is a cartoon corresponding to a TEM micrograph of FIG. 3(a). The rods are bundles of fibrils, which have diameters of 1~2 nm and are elongated polymeric aggregates surrounded with the ionic charges. The long thick curved arrow is a proton traveling path, which moves across the cross section of a membrane in a curved line.

SUMMARY OF THE INVENTION

Figure 1:
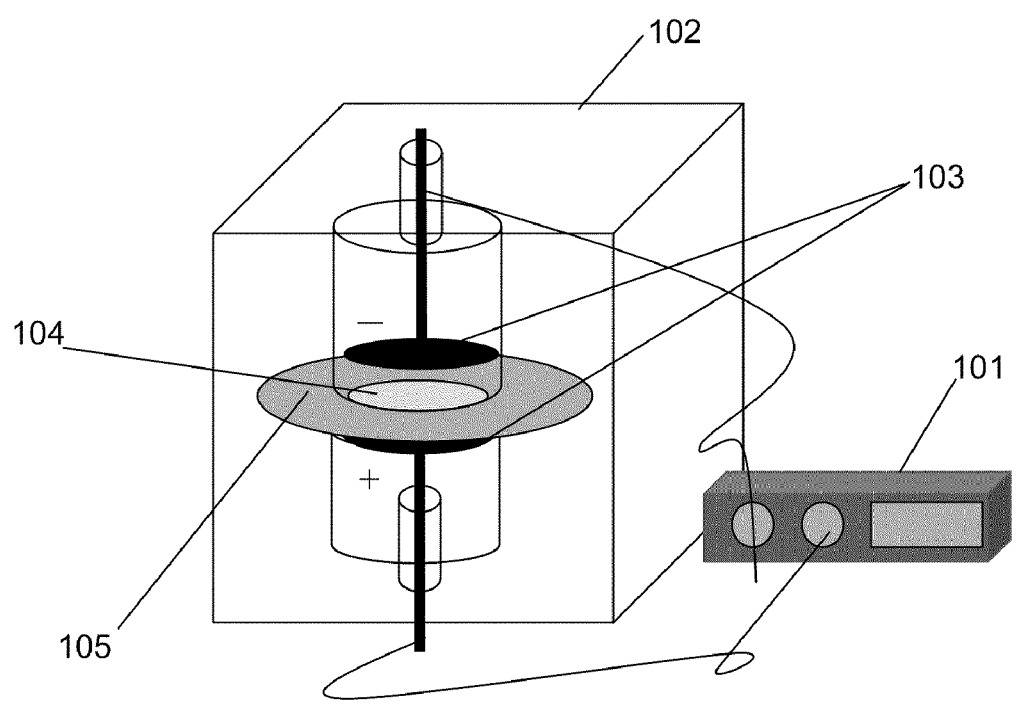
FIG. 1 shows the schematic diagram of an electric field poling apparatus. In this Figure, 101 means high voltage power supply; 102 means thermostate; 103 means electrodes—negative (top); positive (bottom); 104 means membrane and 105 means membrane holder.

This invention provides a method of preparing a perfluorocarbon ionomer membrane with aligned nanostructure which comprises:
(a) casting a perfluorocarbon ionomer solution;
(b) evaporating organic solvent at a temperature below $T_g$ of perfluorocarbon ionomer, wherein the perfluorocarbon ionomer is in an amorphous state;

(c) annealing the amorphous membranes at a temperature between $T_g$ (glass transition temperature) and $T_m$ (crystalline melting temperature) of perfluorocarbon ionomer;

(d) applying an electric field on the membranes during annealing;

(e) keeping the membrane in an electric field and cooled from the annealing temperature to a temperature below $T_g$ of perfluorocarbon ionomer; and (f) moving the power supply of an electric field after the membrane is cooled to a temperature below Tg.

This invention also provides a perfluorocarbon ionomer membrane comprising aligned fibril-like structures in the membrane.

DETAILED DESCRIPTION OF THE INVENTION

The invention is related to the use of an electric field to induce alignment of ionic groups, such as sulfonate, carboxylate, phosphorate, and other acidic groups etc, and thus the alignment of nano-structure of amorphous perfluorocarbon ionomer membranes while annealing the membranes at a temperature between glass transition temperature $T_g$ and crystalline melting temperature $T_m$ of perfluorocarbon ionomer. Before aligning with an electric field, the membranes are prepared by solutions casting and the solvents are evaporated at a temperature below $T_g$ of polymers. Thus the polymers are in amorphous state before they are aligned and annealed.

The present invention improves the ion conductivity of perfluorocarbon ionomer membranes by aligning the nano-structure of ionic group aggregations using an electric field along the membrane thickness direction, which causes linear, less curved, and continuous proton transferring pathways. The membranes are prepared by solution casting from the organic solvent which should be: (1) low boiling point so that it can be easily evaporated (or vacuum evaporated) at a temperature below $T_g$ of perfluorocarbon ionomers; (2) high dielectric constant so that the ionic groups of perfluorocarbon ionomers are in ionic state; (3) compatible with perfluorocarbon ionomers so that the ionomers can be easily dissolved in solvents. For preparing high ionic conductivity perfluorocarbon ionomer membranes, the preferred solvent is N,N'-dimethyl acetamide (DMAc), N,N'-dimethyl formamide (DMF), N-methyl formamide (NMF), glycerol, methanol, ethanol, isopropanol, and water, or mixtures of previous solvents.

The organic solvent is vacuum dried at a temperature below $T_g$ of perfluorocarbon ionomers, and then the membrane is annealed and aligned under an electric field at a temperature between $T_g$ and $T_m$ of perfluorocarbon ionomers. The nano-structure of perfluorocarbon ionomer membranes after applying with an electric field is identified by transmission electron microscopy (TEM) and is found to be aligned along the electric field. The ionic conductivity of membranes with aligned nano-structure along the membrane thickness direction is found to be improved.

The membrane electrode assembly (MEA) prepared from membrane with aligned nano-structure along the membrane thickness direction is found to have a better polyelectrolyte membrane fuel cell (PEMFC) performance than those prepared without nano-structure alignment and the commercial Nafion-117 membrane (Du Pont Co).

In the process of polymer crystallization, the polymer should be annealed at a temperature between $T_g$ and $T_m$ to let the polymer molecular chains have proper energy to move and pack to form crystalline structure. Similar to polymer crystallization, in order to align the nano-structures of perfluorocarbon ionomer membranes by applying an electric field, one should keep the molecules to have proper mobility to move along the electric field direction. Thus to anneal the amorphous membranes at a temperature between $T_g$ and $T_m$ of a polymer while applying an electric field on a membrane is necessary for nano-structure alignment.

Once the polymers are in crystalline state, the high viscosity of polymers causes the molecular chains not easy to move and be aligned along the electric field while they are annealed at a temperature between $T_g$ and $T_m$. Hence, it is necessary that the polymer be in amorphous state before annealing and aligning with an electric field.

The experimental setup is shown in FIG. 1. The membranes are placed between two electrodes. The range of the distance between the two electrodes can be the thickness of the membrane to 5.0 cm. The proper electric field strength applied across the two electrodes for nano-structure alignment is between 3 kVcm$^{-1}$ and 20 kVcm$^{-1}$. Heated nitrogen gas flows through the poling apparatus with a temperature between $T_g$ and $T_m$ of perfluorocarbon ionomer.

This invention provides a method of preparing a perfluorocarbon ionomer membrane with aligned nanostructure which comprises:

(a) casting a perfluorocarbon ionomer solution;

(b) evaporating organic solvents at a temperature below $T_g$ of perfluorocarbon ionomer, wherein the perfluorocarbon ionomers are in an amorphous state;

(c) annealing the amorphous membranes at a temperature between $T_g$ (glass transition temperature) and $T_m$ (crystalline melting temperature) of perfluorocarbon ionomer;

(d) applying an electric field on the membranes during annealing;

(e) keeping the membrane in an electric field and cooling the membrane from the annealing temperature to a temperature below $T_g$ of perfluorocarbon ionomer; and (f) moving the power supply of the electric field after the membrane is cooled to a temperature below Tg.

The organic solvent is characterized in that:

(a) low boiling point so that it can be easily evaporated (or vacuum evaporated) at a temperature below $T_g$ of perfluorosufonate ionomers;

(b) high dielectric constant so that the ionic groups of perfluorocarbon ionomers are in ionic state; and (c) compatible with perfluorocarbon ionomers so that the ionomers can be easily dissolved in solvents.

The preferred organic solvent is N,N'-dimethyl acetamide (DMAc), N,N'-dimethyl formamide (DMF), N-methyl formamide (NMF), glycerol, methanol, ethanol, isopropanol, and water, or mixtures of previous solvents. In the most preferred embodiment, the organic solvent is N,N'-dimethyl acetamide (DMAc). The temperature for annealing a membrane is between $T_g$ and $T_m$ of a perfluorocarbon ionomer. In a preferred embodiment, the annealing temperature is between $T_g$+10° C. and $T_m$. In the most preferred embodiment, the temperature is between $T_g$+20° C. and $T_g$+60° C. but below $T_m$. In the present method, the electric field is between 3 kVcm$^{-1}$ and 20 kVcm$^{-1}$. In a more preferred embodiment, the electric field is between 5 kVcm$^{-1}$ and 18 kVcm$^{-1}$. In the most preferred embodiment, the electric field is between 7 kVcm$^{-1}$ and 10 kVcm$^{-1}$.

In this invention, the perfluorocarbon ionomers are those consisting of polar acid groups, such as —SO$_3$H, —COOH, —PO$_3$H$_2$, or the ionic groups, such as —SO$_3$M, —COOM, —PO$_3$HM, wherein the M represent metal atom.

The nano-structure alignment of a membrane is induced by applying an electric field along the membrane thickness direction to lead ionic aggregates aligned along the membrane thickness direction.

After applying the external electric field along the membrane thickness direction while annealing the membrane at a temperature between $T_g$ and $T_m$ of perfluorocarbon ionomer, the membrane composes of aligned nano fibril-like structures and more aligned ions transferring pathways through the membrane thickness direction (or the cross section of a membrane). Accordingly, the ionic conductivity of a membrane is improved.

After applying an electric field to align ionic aggregations nano-structures along the membrane thickness direction, the membranes have a better ionic conductivity than those without aligned ionic aggregations nano-structures.

This invention also provides a polyelectrolyte membrane comprising an aligned fibril-like structure in the membrane.

In this invention, the preferred polyelectrolyte is selected from the group consisting of polyacrylic acid, polymethacrylic acid, sulfonated polyetherketone, sulfonated polyimide, sulfonated polybenzimidazole, sulfonated polyethersulfone, sulfonated polystyrene, and perfluorosulfonated ionomer.

This invention is prepared according to the method of the invention. The membrane of the present invention has high ionic conductivity and aligned fibril-like structure. The membrane contains a polar acid group or an ionic group and aligned ions transferring pathways in the membrane.

The membrane of the present invention, wherein the alignment is induced by applying an electric field along the membrane thickness direction to lead ionic aggregations aligned along the membrane thickness direction.

In this invention, the membrane contains a polar acid group or an ionic group. In the preferred perfluorocarbon ionomers, the polar acid group is —$SO_3H$, —$COOH$, —$PO_3H_2$, or the ionic group is —$SO_3M$, —$COOM$, —$PO_3HM$, wherein the M represent metal atom. In a preferred embodiment, the polar acid group is —$SO_3H$.

This invention is prepared according to the method of preparing a perfluorocarbon ionomer membrane.

The membrane can be used in fuel cell membrane electrode assembly (MEA), electrochemical cell, and ion exchange membrane. In a preferred embodiment, the membrane can be used in fuel cell MEA preparation.

EXAMPLE

The following example was offered by the way of illustration and not by the way of limitation.

Materials and Membranes Preparation

The solvent of as received 5 wt % perfluorosulfonated resin solution (Nafion-1100 resin solution, Du Pont Co, the solvent was a mixture of water, methanol, propanol, and unspecified mixed ether, the $T_g$ and $T_m$ of Nafion-1100 were around 100° C. and 210° C., respectively) was evaporated at 60° C. under vacuum. The Nafion solid resin was then diluted to 10 wt % with DMAc solvent. The solution was cast in a glass vessel and the solvent was evaporated at 50° C. (which was below $T_g$=100° C. of Nafion) for 30 h, then under vacuum at 60° C. for another 1 h. Thus an amorphous Nafion membrane was obtained.

The amorphous Nafion membrane was placed between the two electrodes as shown in FIG. 1. The distance between the two electrodes was 2.0 cm. A voltage of 15 kV was applied across the two electrodes. Heated nitrogen gas flowed through the poling apparatus with a temperature of 120° C., which was about 20° C. above $T_g$ of Nafion. Two electric field alignment experiments were performed, one with the Nafion membrane surface parallel to the electric field (the electric field was vertical to the membrane thickness direction), the other with the Nafion membrane surface vertical to the electric field (the electric field was along the membrane thickness direction). The annealing time was 30 min.

Ionic Conductivity Measurements of Membranes

Three membranes prepared by solution casting from DMAc solvent and a commercial Naion-117 (Du Pont Co) were used for conductivity measurements. The membrane preparation procedure was described in the membranes preparation section. One of these membranes was annealed at 120° C. for 30 min without applying an electric field. Another one was annealed at 120° C. for 30 min with an electric field (7.5 $kVcm^{-1}$) applied vertically to the surface of the membrane. The other one was annealed at 120° C. for 30 min with an electric field (7.5 $kVcm^{-1}$) applied parallel to the surface of the membrane. After annealing, these membranes were swollen with 1 N sulfuric acid at room temperature for 24 h.

The ionic conductivities ($\sigma$) of membranes were calculated from current resistance (R) using an equation $\sigma=L/(AR)$. Where A was the cross section area of a membrane for a resistance measurement and L the length for a resistance measurement, i.e. the thickness of a membrane. R was measured in a normal mode using an ac impedance system (model SA1125B, Solartron Co, UK). A device capable of holding a membrane for R measurement was located between probes. The testing device with a membrane was kept in a thermostate under a relative humidity of 95% and a temperature of 75° C. The membrane area A for R measurement was 3.14 $cm^2$.

The conductivity data were shown in Table 1. Comparing the conductivities of these membranes, it was found that the membrane after annealing with applying an electric field vertical to the membranes surface (i.e. electric field was along to the membrane thickness direction) has a higher ionic conductivity than other membranes. It was obvious that applying an electric field along the membrane thickness direction (i.e. vertical to the membrane surface) during annealing improved ionic conductivity of membranes.

TABLE 1

Conductivity of Nafion membranes (75° C., 95% RH)

| membranes | thickness (μm) | conductivity (S $cm^{-1}$) | water content (wt %) |
|---|---|---|---|
| No electric field | 176 ± 5 | 0.036 ± 0.003 | 21.5 ± 1.1 |
| Surface parallel to electric field | 168 ± 4 | 0.037 ± 0.005 | 22.3 ± 1.3 |
| Surface vertical to electric field | 172 ± 4 | 0.048 ± 0.004 | 21.3 ± 1.0 |
| Nafion-117 (Du Pont Co) | 175 ± 4 | 0.034 ± 0.004 | 22.1 ± 1.1 |

PEMFC Performances Test

The same membranes used for conductivity measurements, i.e. Nafion-117 and the membranes prepared in this work with applying an electric field vertically to the surface of the membrane and without applying an electric field, were used to prepare membrane electrode assemblies (MEAs). The gas diffusion layer of MEA was a carbon paper (Toray Co, Japan) pretreated with FEP resin (DuPont Co). The Pt/C catalyst content of anode was 0.5 mg/$cm^2$ and that of cathode was 1.0 mg/$cm^2$. The performances of single cells were tested at 70° C. using a Globe Tech Computer Cell GT testing system (Electrochem Inc). The anode $H_2$ input flow rate was 200 ml/min, and the cathode $O_2$ input flow rate was 200 ml/min.

Figure 2:
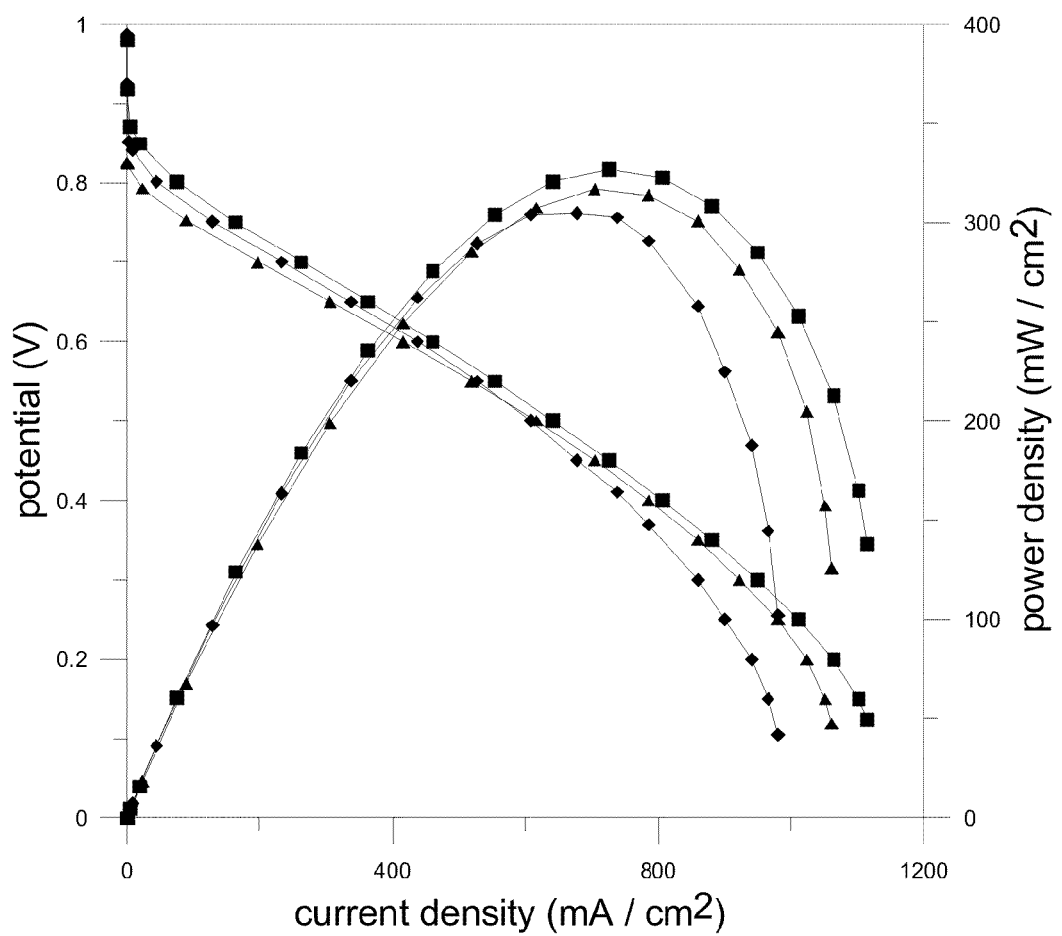
FIG. 2 shows PEMFC performance test results, i.e. voltage and power density versus current density. (♦) Nafion-117; (▲) Nafion membrane prepared by solution casting without applying an electric field; (■) Nafion membrane prepared by solution casting with applying an electric field vertically to the surface of membrane (i.e. electric field is along the membrane thickness direction).

FIG. 2 showed polyelectrolyte membrane fuel cell (PEMFC) performance testing results, i.e. voltage and power density versus current density, with MEA prepared from commercial Nafion-117, and Nafion membranes prepared in this work without and with applying an electric field vertical to the surface of membrane. The open circuit voltage (OCV) data of PEMFCs were also listed in Table 2. As shown in FIG. 2, the MEA prepared from the membrane after applying with an electric field vertically to the surface of the membrane had a much better PEMFC performance than those prepared from other two membranes. The OCV value of Nafion-117 was larger than the OCV value of the membrane after applying with an electric field vertically to the membrane surface. But owing to the higher membrane resistance, the PEMFC prepared from Nafion-117 membrane has a lower voltage at high current density than those prepared from membranes with aligned ionic nano-structure along the membrane thickness direction.

TABLE 2

PEMFC open circuit voltage (OCV) data

| membranes | thickness (μm) | OCV (V) |
|---|---|---|
| No electric field | 176 ± 5 | 0.970 |
| Surface vertical to electric field | 172 ± 4 | 0.983 |
| Nafion-117 (Du Pont Co) | 175 ± 4 | 1.01 |

Morphology Study of Nafion Membranes by TEM

TEM observations were carried out on a Hitachi model 7500 TEM at an accelerating voltage of 75 kV. The Nafion membranes were immersed in 1 N $Pb(NO_3)_2$ aqueous solution for 2 days to stain the ionic clusters of Nafion. The films were then washed with de-ionized water and dried at room temperature. The stained films were embedded in an epoxy resin (#14300, Spurr Co, Pa.) and microtomed with a diamond knife for TEM observations.

(a) The Nafion Membrane which was Annealed without Applying an Electric Field

Figure 3:
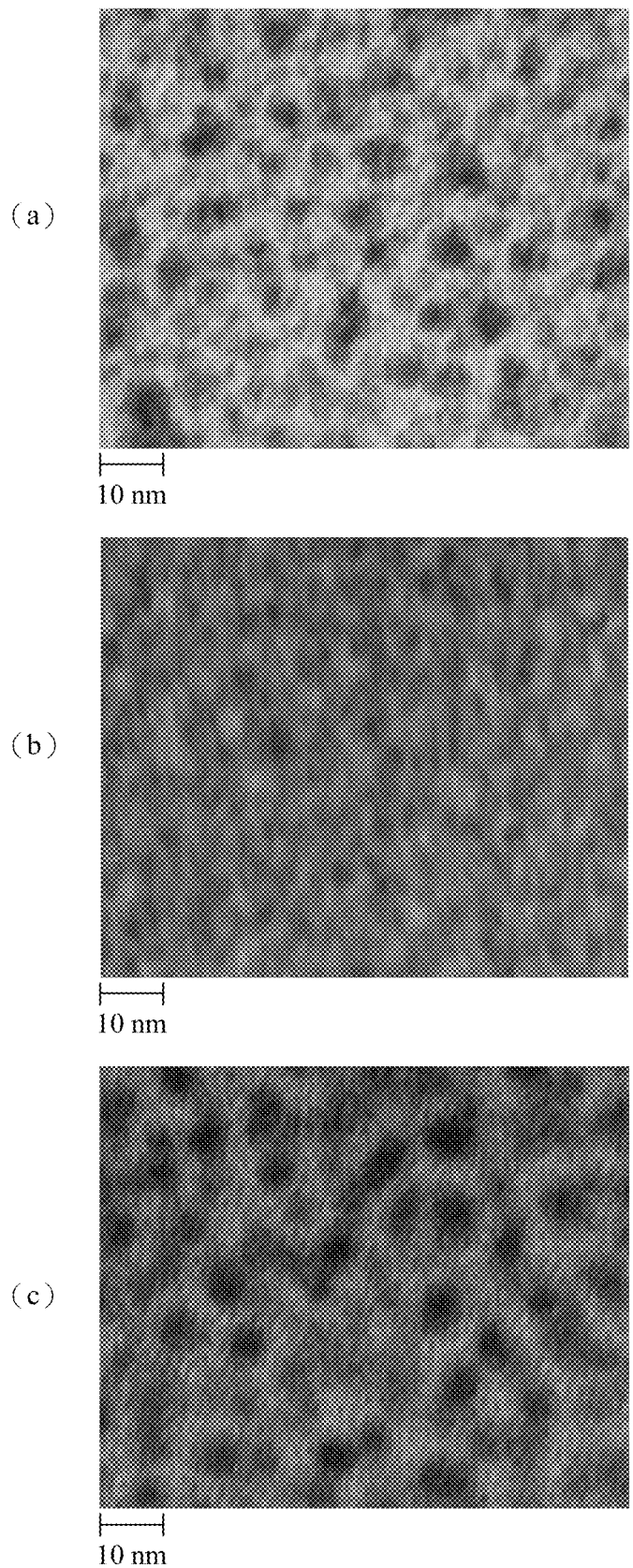
FIG. 3(a) shows TEM micrograph of a Nafion membrane prepared by solution casting from DMAc solvent and annealed at 120° C. for 30 min without applying an electric field (×150000).
FIG. 3(b) shows TEM micrograph of a Nafion membrane prepared by solution casting from DMAc solvent and annealed at 120° C. for 30 min with an electric field (7.5 kV cm$^{-1}$) applied directed from top to down and parallel to the surface of micrograph (×150000).
FIG. 3(c) shows TEM micrograph of a Nafion membrane prepared by solution casting from DMAc solvent and annealed at 120° C. and for 30 min with an electric field (7.5 kV cm$^{-1}$) applied vertically to the surface of micrograph (×150000).

FIG. 3(a) showed the TEM micrograph of a Nafion membrane, which was annealed at 120° C. for 30 min without applying an electric field. In FIG. 3(a), the dark sites were ionic aggregations, which were stained with $Pb(NO_3)_2$ solution, and the gray or bright sites were the aggregates of Nafion perfluorocarbon backbones, which were not stained with $Pb(NO_3)_2$ solution. The degree of darkness of ionic aggregations sites in TEM micrograph depends on —$SO_3H$ group aggregation density and the deepness of the ionic group aggregations below the film surface. The higher —$SO_3H$ group aggregation density and the lower the deepness of ionic aggregations below the film surface, the darker the ionic aggregations sites will be shown in TEM micrograph. An intrinsic fibrillar structure of Nafion membrane has been suggested by Rubatt et al (Rubatt L, Gebel G, Diat O, Macromolecules, 37, 7772 (2004)), the fibrils correspond to elongated polymeric backbones aggregates surrounded with ionic charges. The fibrils were entangled and collapsed with widths of nano-scale and a degree of orientation at the mesoscopic scale. The Nafion membranes were composed assemblies of bundles of fibrils. For Nafion membranes prepared without applying an electric field, the fibrillar-like perfluorocarbone aggregates should distribute isotropically in the membranes. As shown in FIG. 3(a), the oblate or round dark ionic aggregation sites disperse randomly among the gray perfluorocarbon backbone aggregation regions.

The total area of dark sites was slightly less than that of the gray perfluorocarbon backbone aggregation regions. The shapes of dark sites were oblate or round. The oblates sites have long axes of 11~17 nm and short axes of 3~7 nm, and the round circle sites have diameters of 3~7 nm. The oblate dark regions indicate that some of the fibril-like perfluorocarbon aggregates were not in the normal direction of TEM micrograph surface. The round dark regions indicate that the rod-like perfluorocarbon aggregates were in the normal direction of TEM micrograph. The shape of gray perfluorocarbon backbone aggregates regions were cylinder-like or oblates, with width of gray regions raging 1~8 nm. The smallest width of a fibril structure was around 1~2 nm, suggesting that the width of fibrils was around 1~2 nm. The various widths of perfluorocarbon gray regions shown in FIG. 3 were due to the various degrees of aggregations of fibrils bundles.

(b) The Nafion Membrane which was Annealed with Applying an Electric Field Parallel to the Surface of Membrane FIG. 3(b) showed the TEM micrograph of Nafion membrane after annealing at 120° C. for 30 min with applying an electric field (7.5 $kVcm^{-1}$) directed from top to down and parallel to the surface of membrane. The micrograph shows that perfluorocarbon backbones aggregate and entangle to form rope-like structures (bright and gray regions in FIG. 3(b)), which were aligned along the electric field. The diameter of ropes was around 3~6 nm. The ionic pedant side chains locate around the surface of rope-like structures (dark regions in FIG. 3(b)).

(c) The Nafion Membrane which was Annealed with Applying an Electric Field Vertically to the Surface of the Membrane FIG. 3(c) showed the TEM micrograph of Nafion membranes after annealing at 120° C. for 30 min with applying an electric field (7.5 kV $cm^{-1}$) vertically to the surface of membrane. Comparing with FIG. 3(a), FIG. 3(c) shows more dark sites appear in the TEM micrograph. These dark sites were round in shape and distribute more regularly than those shown in FIG. 3(a), indicating that the rod-like perfluorocarbone backbones aggregates were aligned normal to the surface of TEM micrograph and thus the ionic —$SO_3H$ groups aggregating sites were also aligned normal to the surface of TEM micrograph.

Nano-structure Models of Nafion Membranes

Figure 4A:
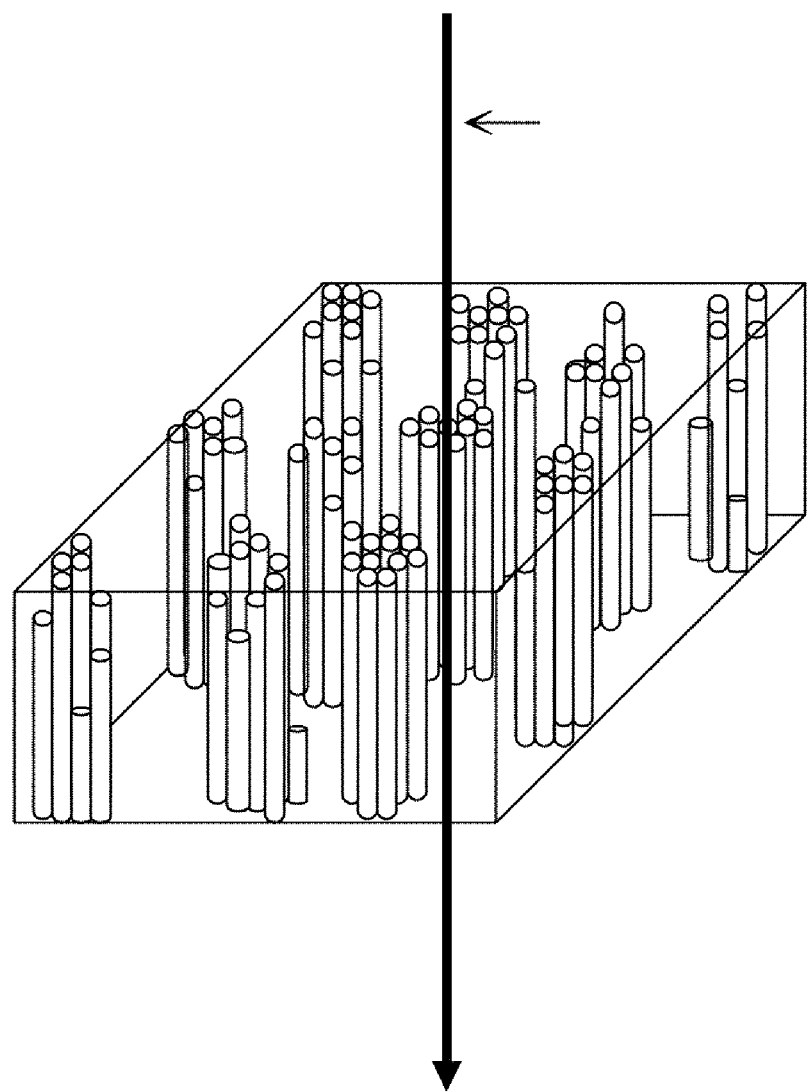
FIG. 4(a) shows the proposed microstructure of Nafion membranes prepared by solution casting and annealing at 120° C. for 30 min with applying an electric field (small thin arrow) vertically to the surface of a membrane (i.e. electric field is along the membrane thickness direction).
Figure 4B:
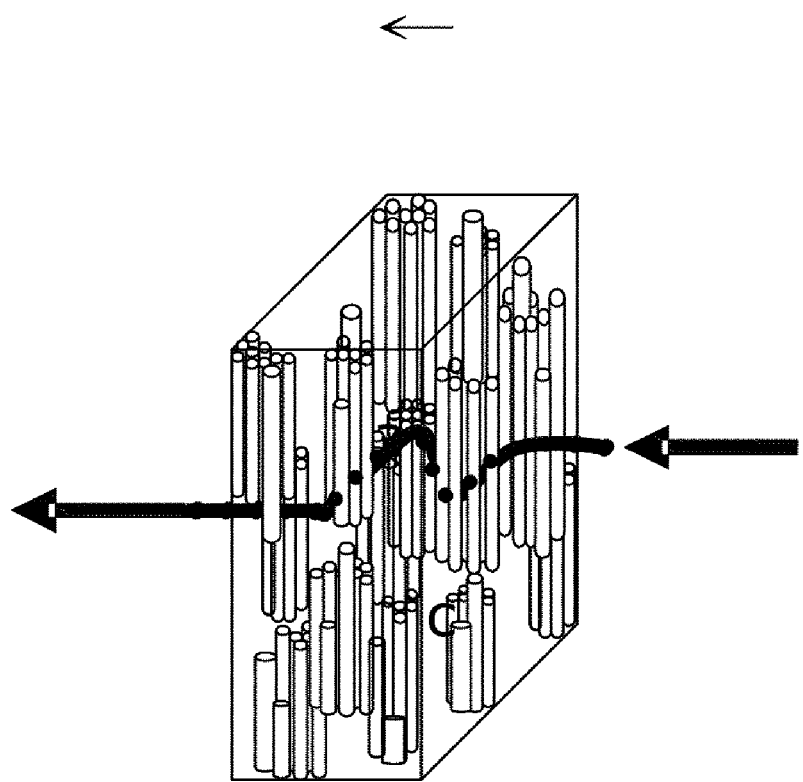
FIG. 4(b) shows the proposed microstructure of Nafion membranes prepared by solution casting and annealing at 120° C. for 30 min with applying an electric field (small thin arrow) along the surface of micrograph (i.e. surface of membrane). The FIG. 4(b) is a cartoon corresponding to a TEM micrograph of FIG. 3(b). The rods are bundles of fibrils, which have diameters of 1~2 nm and are elongated polymeric aggregates surrounded with the ionic charges. The rods are aligned along the membrane surface direction. The long thick curved arrow is a proton traveling path, which moves across the cross section of a membrane and in a direction vertical to the electric field in a curved line.
Figure 4C:
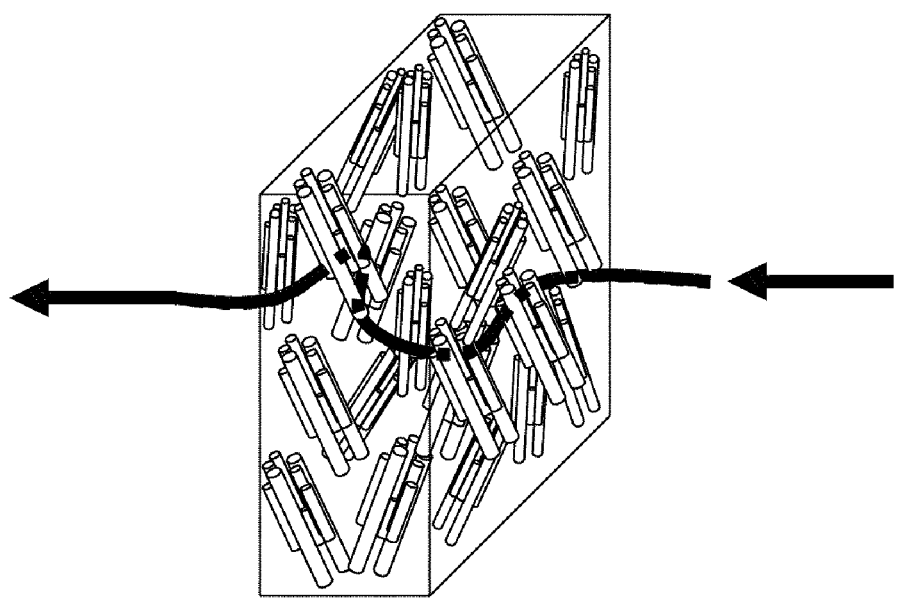
FIG. 4(c) shows the proposed microstructure of Nafion membranes prepared by solution casting and annealing at 120° C. for 30 min without applying an electric field.

From TEM micrograph (FIGS. 3(b) and 3(c)), it was obvious that applying an electric field (small thin arrow in FIG. 4(a)) along the membrane thickness direction during annealing at 120° C. caused Nafion fibrils to be aligned along the membrane thickness direction (FIG. 4(a)). Thus the contour lengths for ions transferring from one side to other side of a membrane (long thick linear arrow in FIG. 4(a)), i.e. along the membrane thickness direction, were same as the membrane thickness. If the electric field (small thin arrow in FIG. 4(b)) was applied vertically to the membrane thickness direction (i.e. parallel to the surfaces of membranes) then the Nafion fibrils were aligned vertically to the membrane thickness direction (FIG. 4(b)). The pendant side chains —$SO_3H$ groups, which were located surrounding the surfaces of fibrils, were all also aligned vertically to the membrane thickness direction. Thus the ions pathway traveling across the cross section of a membrane (long thick curved arrow in FIG. 4(b)) may not be linear, and the contour lengths of ion transferring pathways were longer than the membrane thickness. For membranes prepared without applying an electric field, the orientations of long axes of fibrils were random in the membranes (FIG. 4(c)). The pendant side chain —SO₃H groups, which were located on the surfaces of fibrils, were all also distributed with random orientations in the membranes. Thus the ions pathways (long thick curved arrow in FIG. 4(c)) traveling across the cross section of a membrane, i.e. through the membrane thickness direction, should not be linear and were in curved lines. The contour lengths of ions pathways (the pathways should pass through the cross section of a membrane) for membranes prepared without applying an electric field were also longer than the membrane thickness. Thus the ion conductivity of membranes prepared with applying an electric field vertically to the membrane surface was higher than those of membranes prepared with applying an electric field parallel to the membrane surface and of membranes prepared without applying an electric field.

What is claimed is:

1. A perfluorocarbon ionomer membrane consisting of an aligned fibril-like structure in the membrane, wherein the alignment is induced by applying an electric field along the membrane thickness direction to lead ionic aggregations aligned along the membrane thickness direction.

2. The membrane of claim 1, which has high ionic conductivity and aligned fibril-like structure.

3. The membrane of claim 1, which contains linear ions transferring pathways in the membrane.

4. The membrane of claim 1, which is prepared according to a method comprising:

(a) casting a perfluorocarbon ionomer solution;
(b) evaporating organic solvents at a temperature below $T_g$ (glass transition temperature) of perfluorocarbon ionomer to form an amorphous membrane;
(c) annealing the amorphous membrane at a temperature between $T_g$ and $T_m$ (crystalline melting temperature) of perfluorocarbon ionomer;
(d) applying an electric field on the membrane during annealing;
(e) keeping the membrane in an electric field and cooling the membrane from the annealing temperature to a temperature below $T_g$ of perfluorocarbon ionomer; and
(f) moving the power supply of the electric field after the membrane is cooled to a temperature below $T_g$.

5. The membrane of claim 1, which contains a polar acid group or an ionic group.

6. The membrane of claim 5, wherein the polar acid group is —SO₃H, —COOH, —PO₃H₂ or the ionic group is —SO₃M, —COOM, —PO₃HM, wherein the M represents a metal atom.

7. The membrane of claim 6, wherein the polar acid group is —SO₃H.

8. The membrane of claim 1, which can be used in fuel cell membrane electrode assembly (MEA), electrochemical cell, or ion exchange polymer.

* * * * *